US008172605B2

(12) United States Patent
Lee et al.

(10) Patent No.: US 8,172,605 B2
(45) Date of Patent: May 8, 2012

(54) BACKLIGHT UNIT AND LAMP SOCKET THEREOF

(75) Inventors: Yen Lin Lee, Hsin-Chu (TW); Shih Che Fu, Hsin-Chu (TW); Ching Fu Tien, Hsin-Chu (TW); Chao Chin Wei, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 12/870,091

(22) Filed: Aug. 27, 2010

(65) Prior Publication Data

US 2010/0323556 A1 Dec. 23, 2010

Related U.S. Application Data

(62) Division of application No. 12/471,944, filed on May 26, 2009, now abandoned.

(30) Foreign Application Priority Data

Nov. 21, 2008 (TW) .............................. 97145047 A

(51) Int. Cl.
*H01R 13/73* (2006.01)
*H02B 1/01* (2006.01)

(52) U.S. Cl. ....................................................... 439/557

(58) Field of Classification Search .................. 439/567, 439/336, 226, 557, 558
See application file for complete search history.

(56) References Cited

U.S. PATENT DOCUMENTS 4,955,816 A * 9/1990 Roberts et al. ................ 439/421
2006/0279957 A1 12/2006 Kwon et al.
2010/0130059 A1 * 5/2010 Lee et al. ...................... 439/567

FOREIGN PATENT DOCUMENTS

KR 10-2006-0057874 1/2008
TW M309646 4/2007

OTHER PUBLICATIONS

Taiwanese Office Action dated Jul. 27, 2011 for 097145047, which is a corresponding Taiwanese application, that cites KR 10-2006-0057874A, TW M309646, and US 2006/0279957A1.

* cited by examiner

*Primary Examiner* — Javaid Nasri
(74) *Attorney, Agent, or Firm* — WPAT, P.C.; Anthony King

(57) ABSTRACT

A lamp socket includes a socket body, a flange and a plurality of support members. The flange is connected to the socket body and protrudes from the socket body horizontally. The plurality of support members are connected to the socket body. At least one engaging groove including at least two engaging widths is formed between the plurality of the support members and the flange, so as to secure the socket body to a bezel.

5 Claims, 12 Drawing Sheets

BACKLIGHT UNIT AND LAMP SOCKET THEREOF

CROSS-REFERENCE TO RELATED APPLICATION

This is a divisional application of U.S. patent application Ser. No. 12/471,944, which is filed May 26, 2009 now abandoned and claims the priority benefit of Taiwan application serial no. 97145047, filed Nov. 21, 2008. The entirety of the above-mentioned patent application is hereby incorporated by reference herein and made a part of specification.

BACKGROUND OF THE INVENTION (A) Field of the Invention

The present invention relates to a backlight unit and the lamp socket thereof, and more specifically, to a backlight unit and lamp socket for panel display applications.

(B) Description of Related Art

A backlight unit is one of the key components of a liquid crystal display (LCD). Since liquid crystal is not luminous, the backlight unit is introduced to serve as a light source capable of generating sufficient brightness and even light distribution, so that liquid crystal can display desired images. LCD display is widely used in the electronic devices with great development potential such as desktop monitors, notebook computers, digital cameras and projectors, and there is increasing demand for backlight units and their related devices.

The lamps of a traditional backlight unit are secured to the back bezel by lamp sockets. The lamp sockets are provided with hooks at the places corresponding to the bezel, thereby securing the lamp sockets to the bezel.

The hooks connecting the lamp sockets and the bezel are only suited for the bezel of a single thickness; however, the thickness of the bezel may vary according to the sizes of the display panel or different applications. Therefore, the manufacturer has to produce various lamp sockets to accommodate different bezel thicknesses. As a result, manufacturing costs such as mold cost, production and inventory management are greater than if a more versatile design were produced.

Because the standards of process (SOP) of panel assemblies are not the same, the assembly and disassembly manners are different. Some lamp sockets have to be assembled or disassembled by using special fixtures. Consequently, the throughput is lowered and the rework process is complicated.

SUMMARY OF THE INVENTION

In order to resolve the above problems, the present invention provides a backlight unit and the lamp socket thereof. A single lamp socket that can be secured to bezels of different thicknesses is provided, so as to simplify inventory management and significantly lower the mold cost of preparing various lamp sockets.

According to a first aspect of the present invention, a lamp socket includes a socket body, a flange and a plurality of support members. The flange is connected to the socket body, and horizontally protrudes from the socket body. The plurality of support members are connected to the socket body. At least one engaging groove including at least two engaging widths is formed between the plurality of the support members and the flange, so as to secure the socket body to a bezel.

In a first embodiment, the top of the support member is a stepped structure including a plurality of steps, and the engaging groove of at least two engaging widths is formed between the plurality of the steps and the flange.

In a second embodiment, the support member is a forked structure including a plurality of branches, and the engaging groove of at least two engaging widths is formed between the plurality of the branches and the flange.

In a third embodiment, the support members are disposed at opposite sides of the socket body, and the engaging grooves of different engaging widths are formed between the tops of the support members at opposite sides and the flange.

According to a second aspect of the present invention, a backlight unit includes a bezel and the above-mentioned lamp socket.

According to a third aspect of the present invention, a backlight unit includes a lamp socket and a bezel. The lamp socket includes a socket body and at least one clamp member. The clamp member extends from the socket body and forms at least one horizontal engaging groove. The bezel has at least one bending end that is engaged in the engaging groove, in which the depth of the engaging groove is greater than or equal to the height of the bending end for engaging the bending end therein.

In accordance with the present invention, a single lamp socket can be used for bezels of different thicknesses, thereby tremendously increasing flexibility in use. Therefore, the lamp socket can be used for backlight units of different sizes and has superior commonness, and accordingly the production cost and the likelihood of assembly errors in the production line can be decreased.

DETAILED DESCRIPTION OF THE INVENTION

The making and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
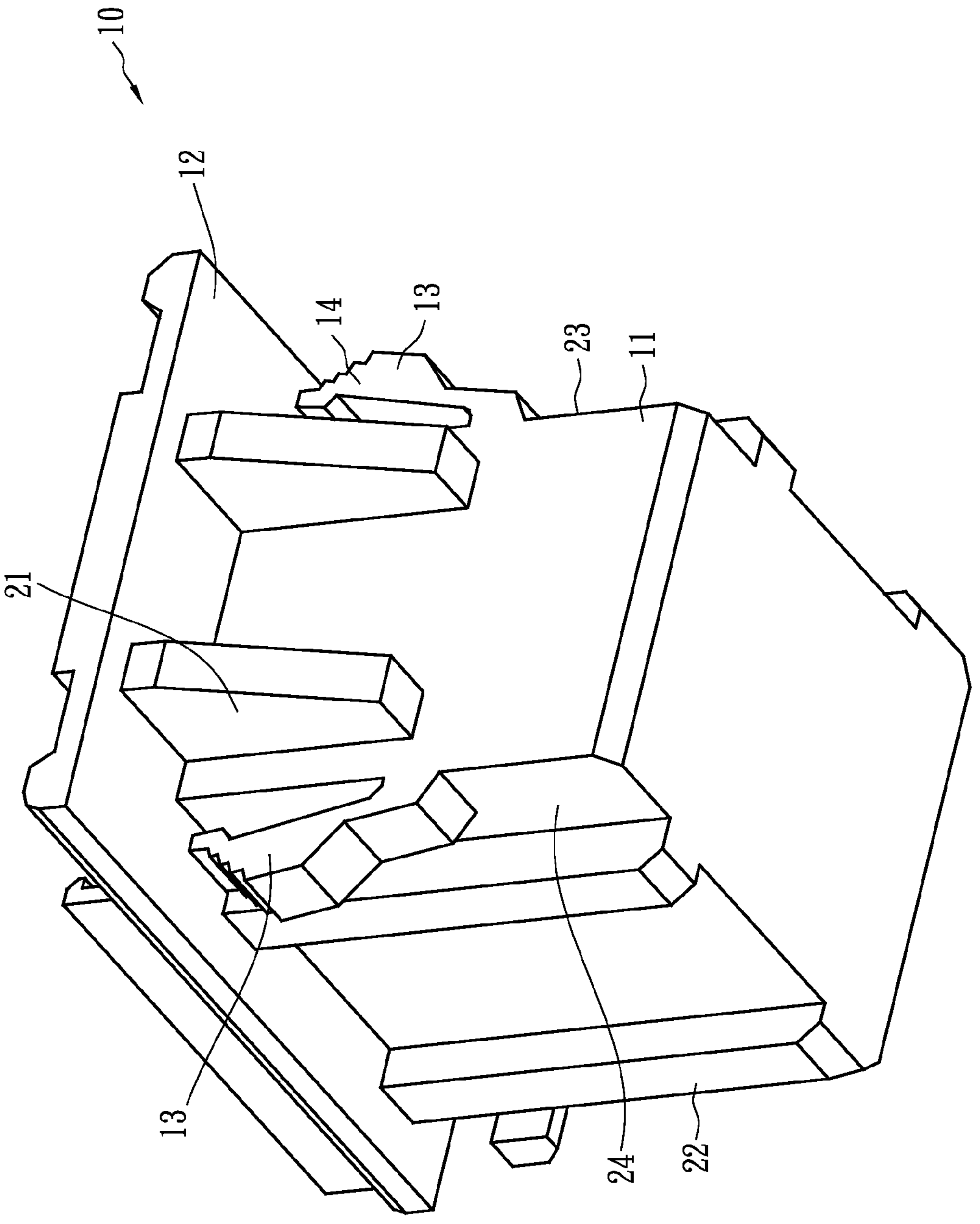
FIGS. 1 through 4 illustrate a lamp socket in accordance with a first embodiment of the present invention.
Figure 2:
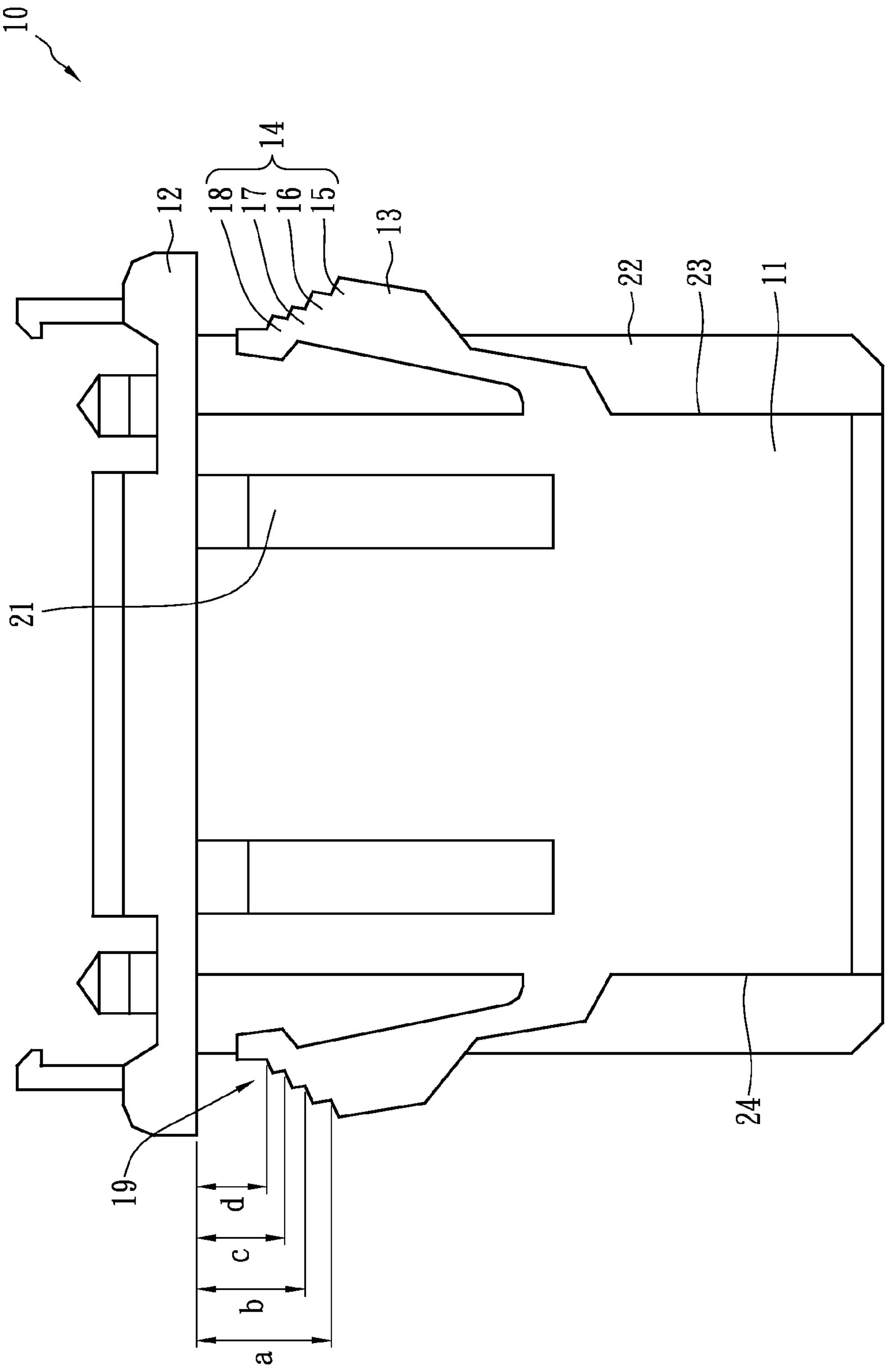
Figure 3:
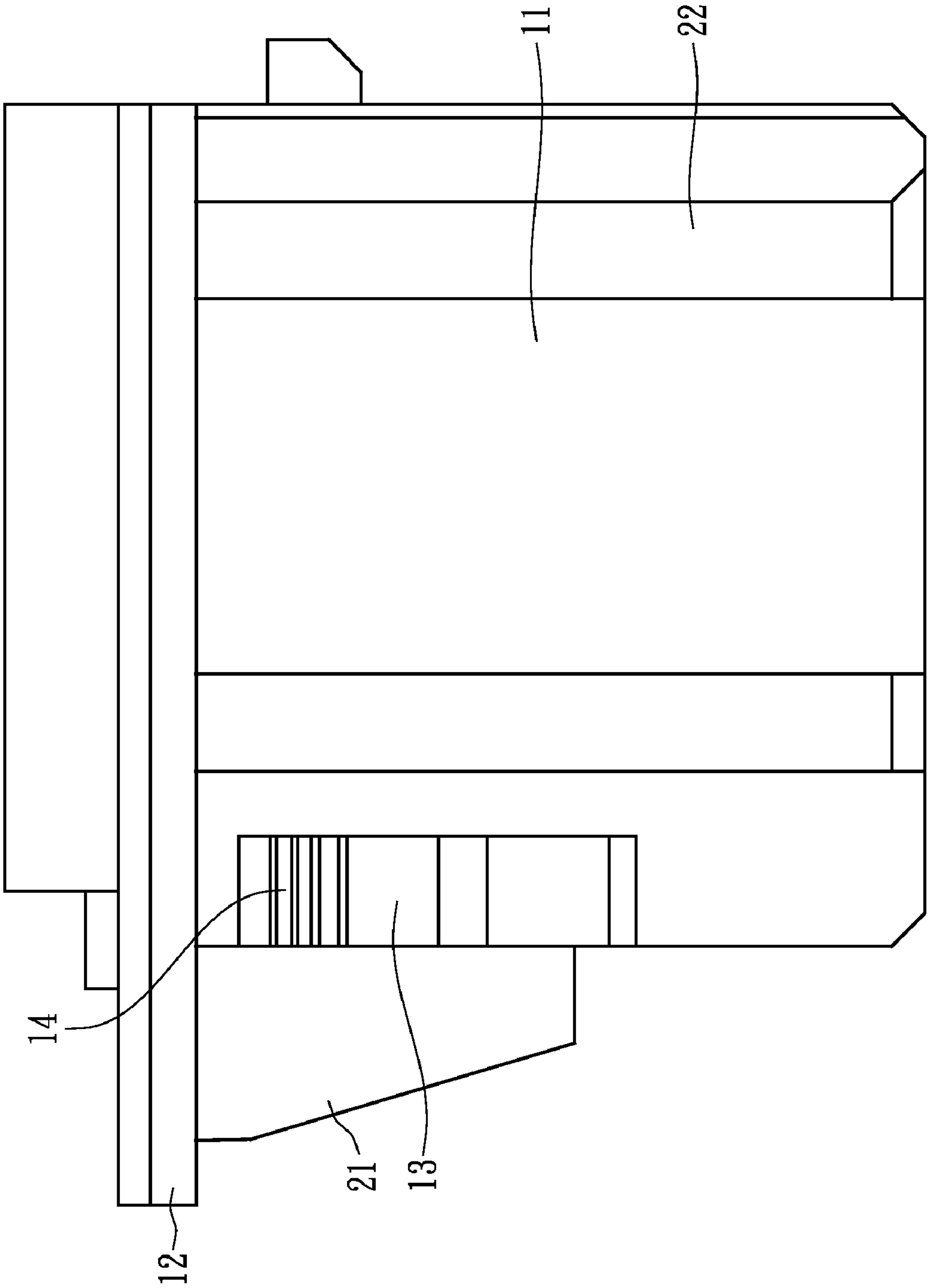

FIG. 1 illustrates a lamp socket in accordance with a first embodiment of the present invention, and FIG. 2 and FIG. 3 illustrate the front view and side view of the lamp socket shown in FIG. 1. A lamp socket 10 includes a socket body 11, and the upper portion of the socket body 11 is provided with a flange 12 that is connected to the socket body 11 and horizontally protrudes from the socket body 11. Two support members 13 are connected to the socket body 11 and extend upward. In this embodiment, the socket body 11 includes a first side surface 23 and a second side surface 24 opposite to the first side surface 23. The two support members 13 are placed at the first side surface 23 and the second side surface 24, respectively.

As shown in FIG. 1 and FIG. 2, in this embodiment, the top of the support member 13 is a stepped structure 14 including a first step 15, a second step 16, a third step 17 and a fourth step 18. Accordingly, the gaps between the stepped structure 14 and the flange 12 correspond to a first engaging width a, a second engaging width b, a third engaging width c and a fourth engaging width d for engaging with bezels of different thicknesses, thereby increasing the application variety of the lamp socket 10. In other words, the gap between the support member 13 and the flange 12 forms an engaging groove 19 of multiple engaging widths, and therefore the socket body 11 can be engaged with the bezels of different thicknesses. This is shown in further detail in FIG. 4.

As shown in FIG. 1 and FIG. 3, the support member 13 is placed at two sides of the front of the lamp socket 10. The lamp socket 10 has reinforced ribs 22 on the socket body 11, and the reinforced ribs 22 and the support members 13 are placed on the same side surfaces. The front of the socket body 11 is provided with a reinforced plate 21. The tops of the reinforced ribs 22 and the reinforced plates 21 are connected to the bottom of the flange 12 to increase the strength and rigidity of the lamp socket 10.

Figure 4:
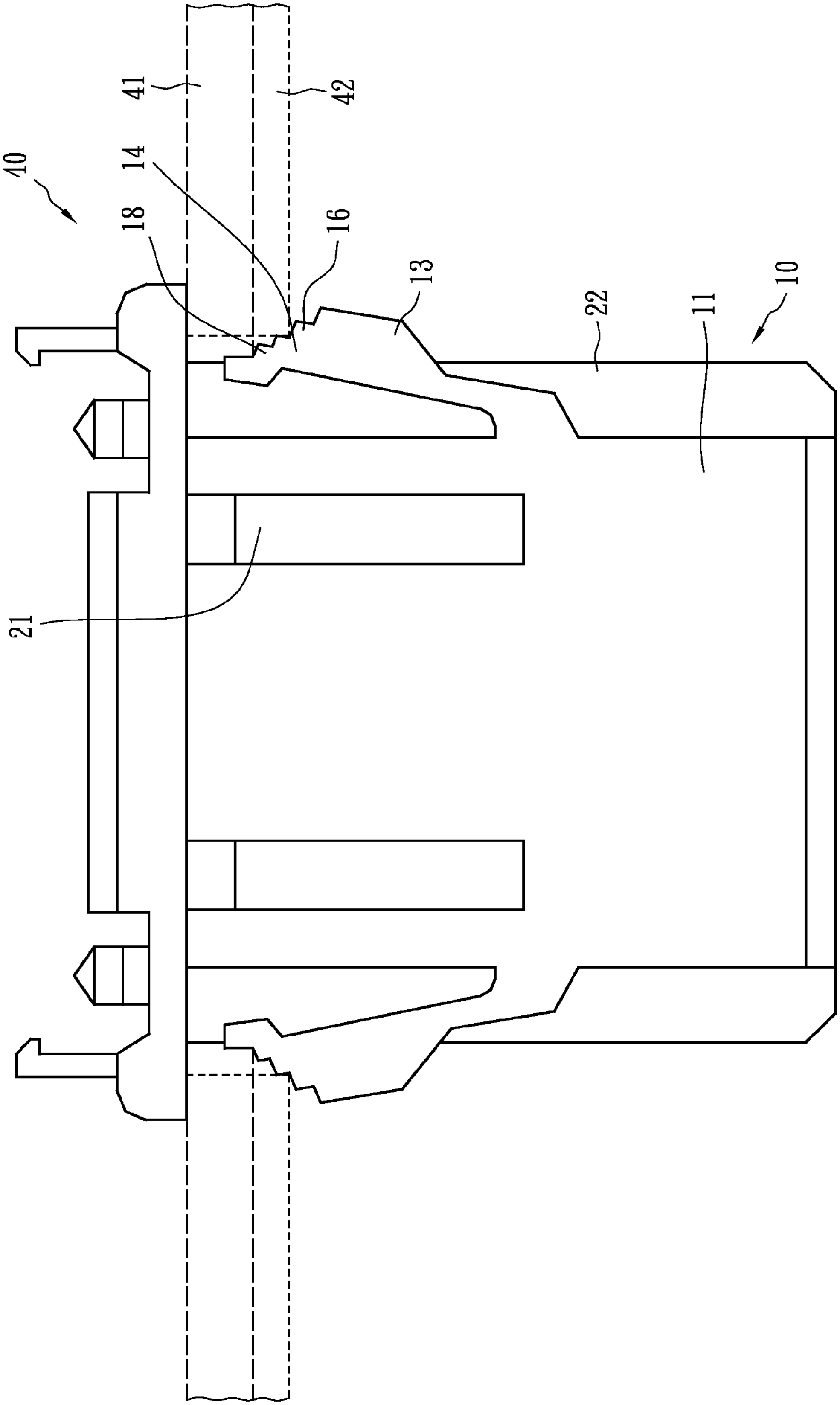

FIG. 4 illustrates a backlight unit 40 including the above-mentioned lamp socket 10 which is engaged with bezel 41 or 42 (dotted lines). The thinner bezel 41 is engaged with a higher step of the stepped structure 14, e.g., the fourth step 18. The thicker bezel 42 is engaged with a lower step of the stepped structure 14, e.g., the second step 16. Accordingly, if the bezels 41 and 42 have different thicknesses, the lamp socket 10 can be engaged with either bezel 41 or 42 according to the design of the stepped structure 14.

Figure 5:
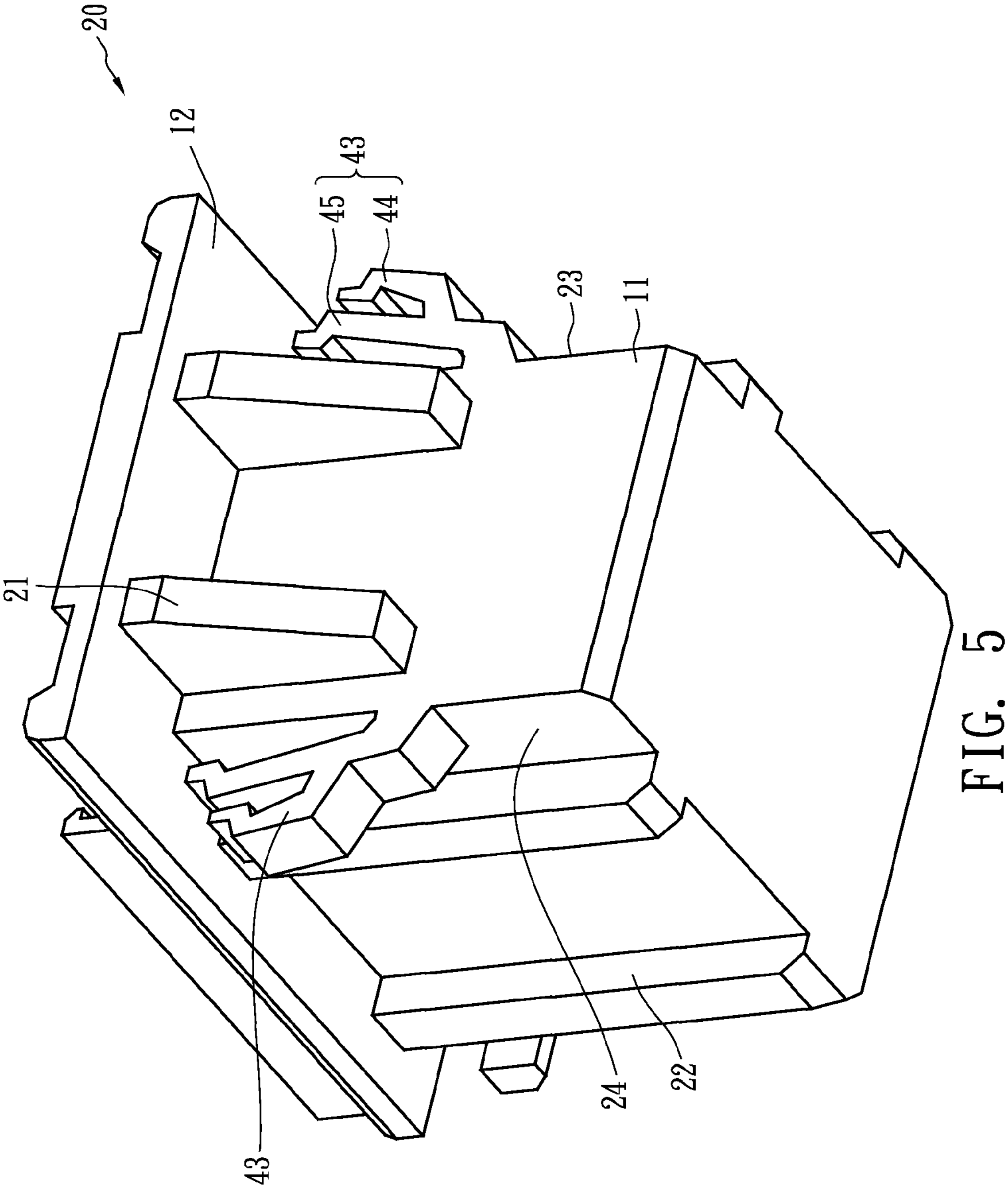
FIGS. 5 and 6 illustrate a lamp socket in accordance with a second embodiment of the present invention.
Figure 6:
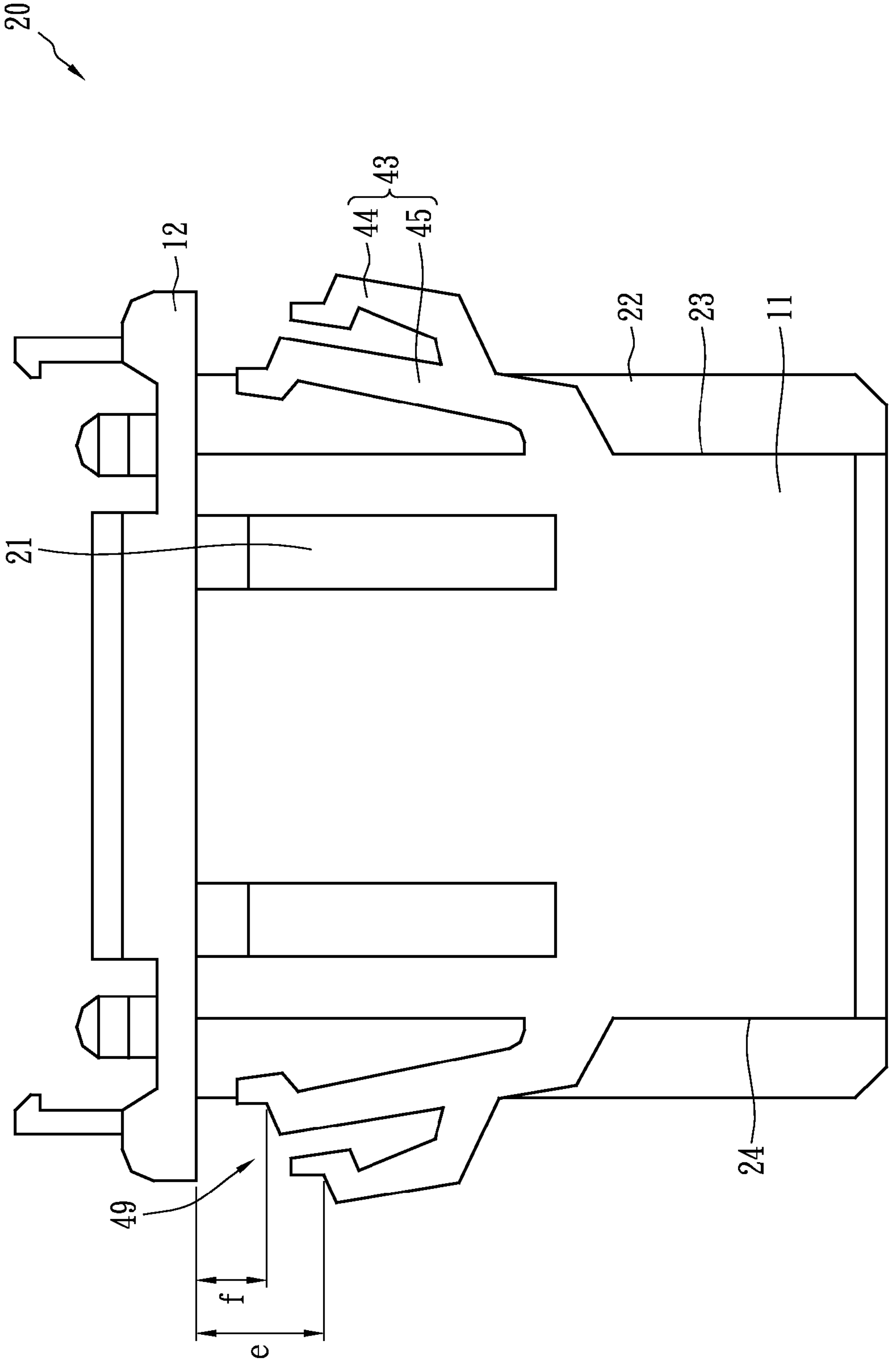

FIG. 5 illustrates the lamp socket in accordance with the second embodiment of the present invention, and FIG. 6 illustrates the front view of the lamp socket shown in FIG. 5. A lamp socket 20 includes a socket body 11, and the upper portion of the socket body 11 is provided with a flange 12 connected to the socket body 11 and horizontally protruding from the socket body 11. Two support members 43 are connected to the socket body 11 and extend upward. In this embodiment, the socket body 11 includes a first side surface 23 and a second side surface 24 opposite to the first side surface 23. The two support members 43 are placed at the first side surface 23 and the second side surface 24, respectively.

As shown in FIG. 6, in this embodiment, the support member 43 is a forked structure, and includes at least a first branch 44 and a second branch 45. The gap between the top of the first branch 44 and the flange 12 corresponds to a first engaging width e, and the gap between the top of the second branch 45 and the flange 12 corresponds to a second engaging width f. In other words, the gap between the support member 43 and the flange 12 includes an engaging groove 49 of multiple engaging widths, and therefore the lamp socket 20 can be engaged with backlight units having bezels of different thicknesses.

Likewise, the lamp socket 20 may have the reinforced ribs 22 and the reinforced plates 21 to increase the strength and rigidity of the entire lamp socket 20.

The differences of the lamp socket 10 of the first embodiment and the lamp socket 20 of the second embodiment are the detail structures of the support members 13 and 43; of which one support member 13 uses a stepped structure 14 while the other support member 43 uses a forked structure including branches 44 and 45. All the designs are intended to form engaging grooves 19 and 49 each including at least two engaging widths between the support members 13 or 43 and the flange 12.

Figure 7:
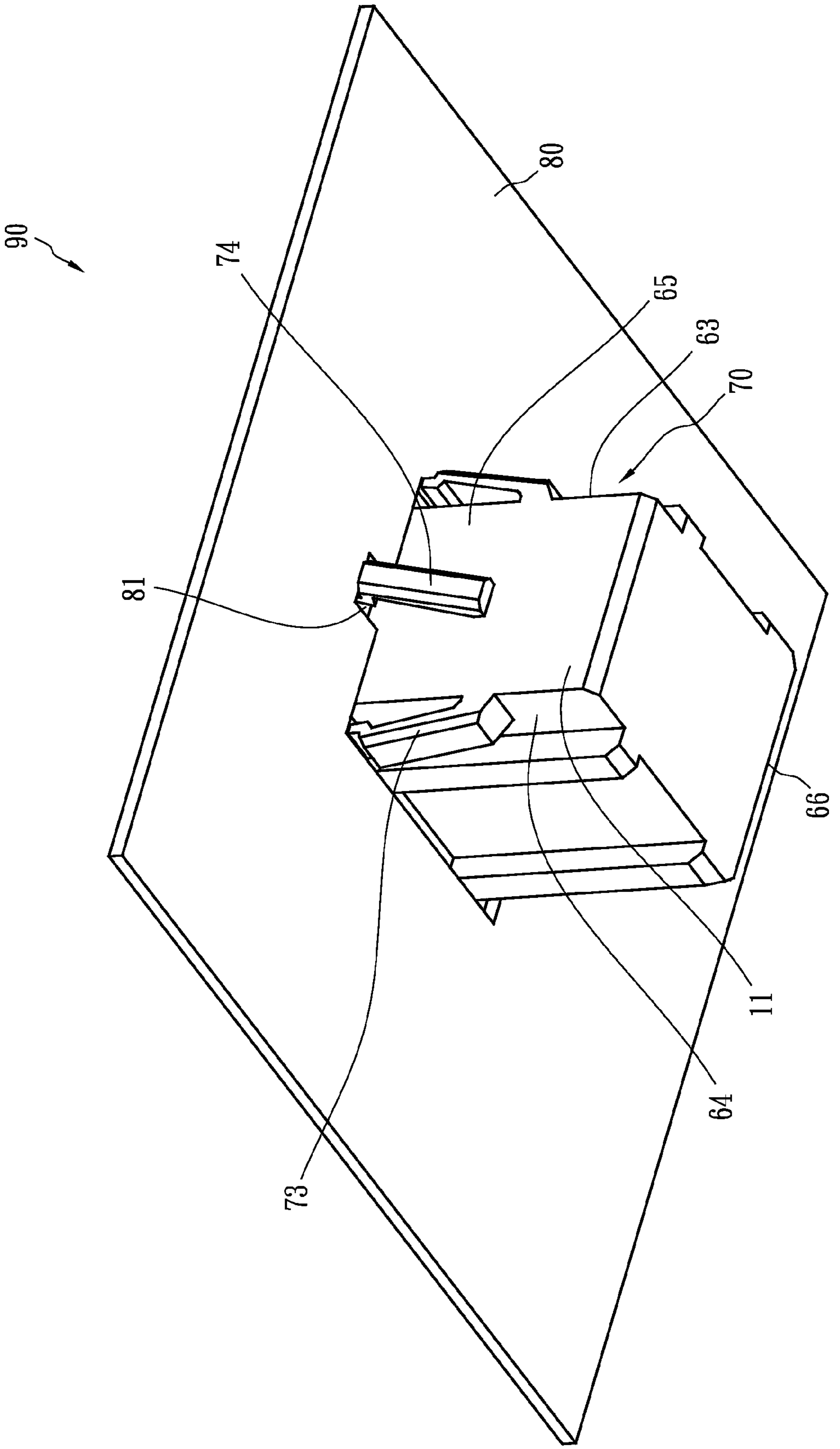
FIGS. 7 through 9 illustrate a lamp socket in accordance with a third embodiment of the present invention.
Figure 8:
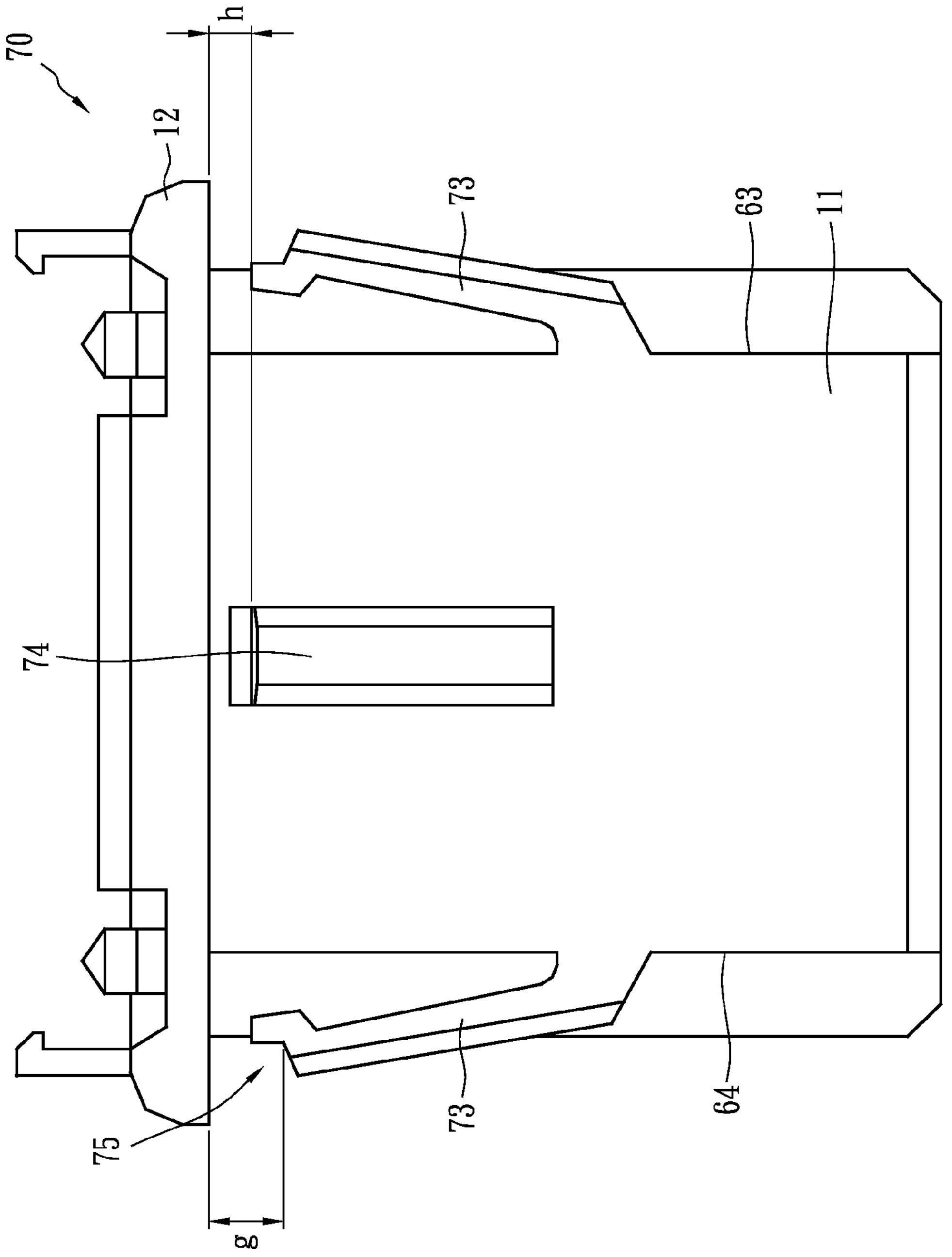
Figure 9:
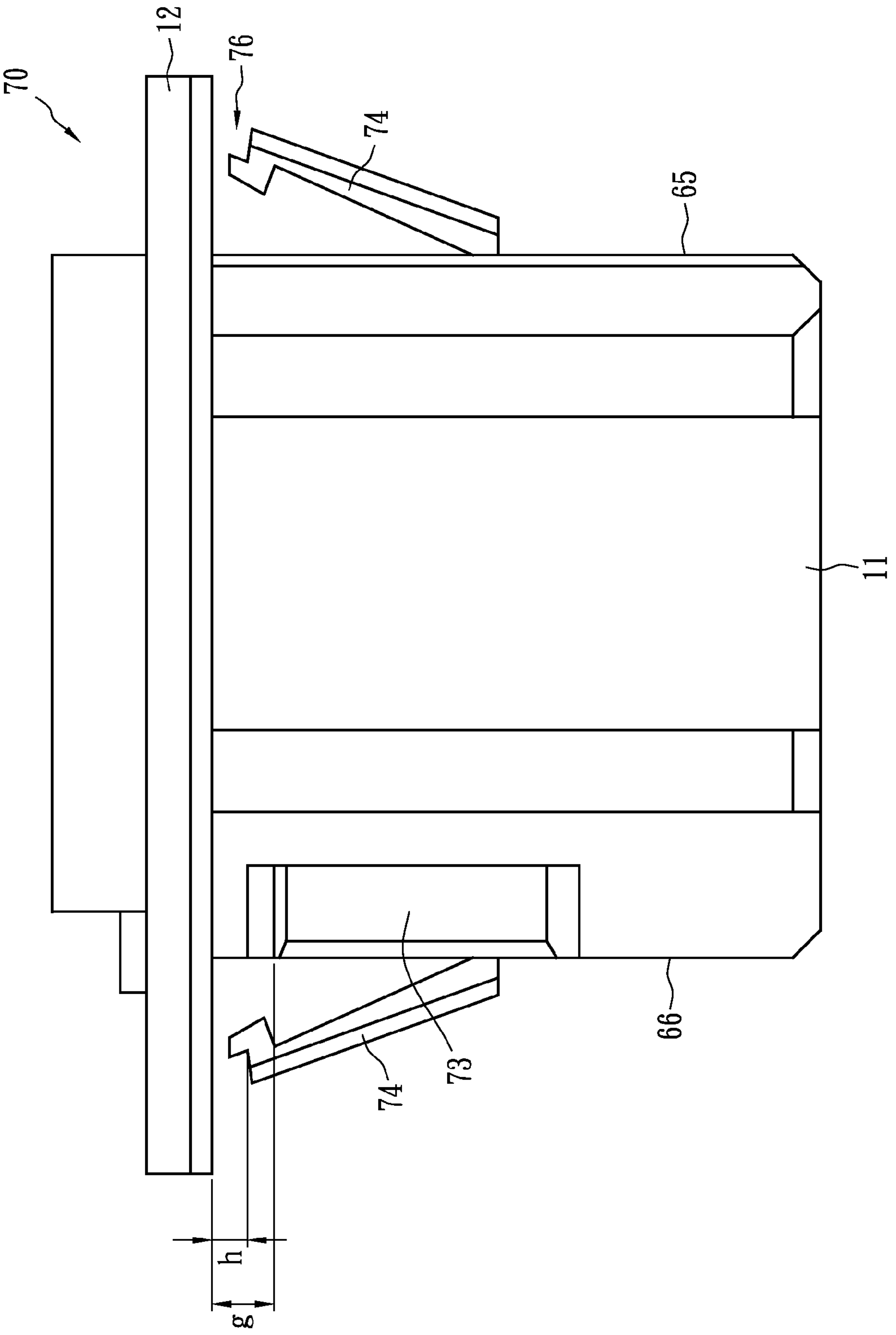

FIG. 7 illustrates a lamp socket in accordance with a third embodiment of the present invention, in which the lamp socket is engaged with a bezel of a backlight unit. FIG. 8 and FIG. 9 illustrate the front view and the side view, respectively, of the lamp socket shown in FIG. 7. A backlight unit 90 includes a lamp socket 70 and a bezel 80. The lamp socket 70 includes a socket body 11, and the upper portion of the socket body 11 is provided with a flange 12 connected to the socket body 11 and horizontally protruding from the socket body 11. In this embodiment, the socket body 11 includes a first side surface 63, a second side surface 64 opposite to the first side surface 63, a third side surface 65 and a fourth side surface 66 opposite to the third side surface 65. As shown in FIG. 8 and FIG. 9, two support members 73 are placed at the first side surface 63 and the second side surface 64, respectively. The gap between the top of the support member 73 and the flange 12 forms an engaging groove 75 with an engaging width g. Two support members 74 are placed at the third side surface 65 and the fourth side surface 66, respectively. The gap between the top of the support member 74 and the flange 12 forms the engaging groove 76 with an engaging width h. The engaging width g and the engaging width h are of different dimensions, allowing the lamp socket to be applied to bezels of different thicknesses.

As shown in FIG. 7, if the thickness of the bezel 80 is approximately equal to the engaging width h, the support members 74 are used for securing the lamp socket 70 to the bezel 80. That is, when the lamp 70 is secured to the bezel 80, the engaging grooves 76 of the support members 74 contact and support the bezel 80, and the engaging grooves 75 of the support members 73 do not contact the bezel 80. If the first side surface 63 and the second side surface 64 are viewed as a pair of opposite surfaces and the third side surface 65 and the fourth side surface 66 are viewed as another pair of opposite surfaces, the support members 73 and 74 are formed on a different pair of opposite surfaces of the socket body 11, and the gaps between the tops of the support members 73 and 74 on the different pair of opposite surfaces and the flange 12 form the engaging grooves 75 and 76 of different engaging widths.

Moreover, the bezel 80 includes openings 81 which are positioned corresponding to the support members 74, allowing the lamp socket 70 to be secured to the bezel 80. In addition, if the support member 73 is used for supporting a thicker bezel, the bezel 80 has to have larger openings 81 to bypass the engaging grooves 76 of the support members 74. Consequently, the bezel 80 can be contacted and supported by the engaging grooves 75 of the support members 73.

Figure 10:
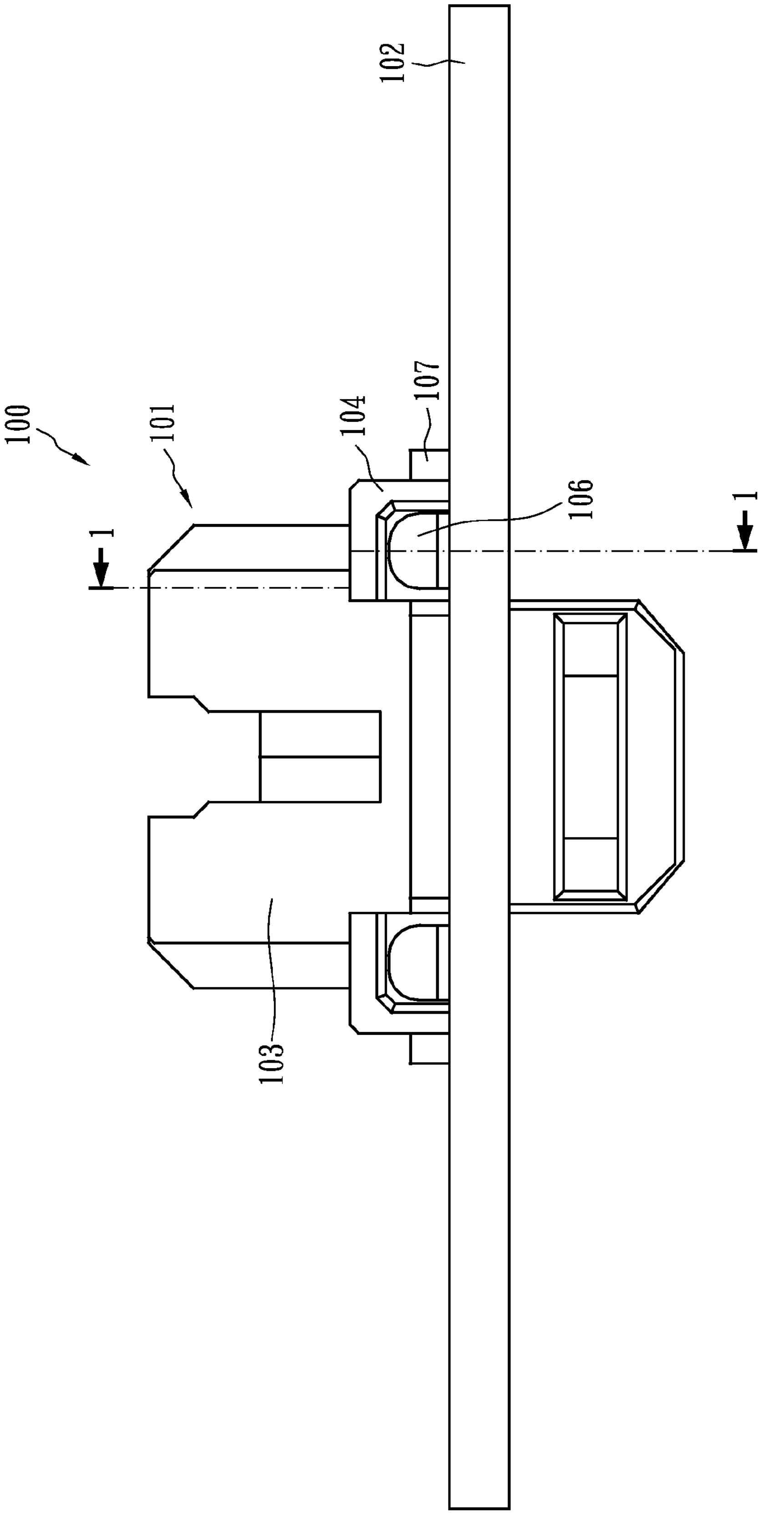
FIGS. 10 and 11 illustrate a lamp socket in accordance with a fourth embodiment of the present invention.
Figure 11:
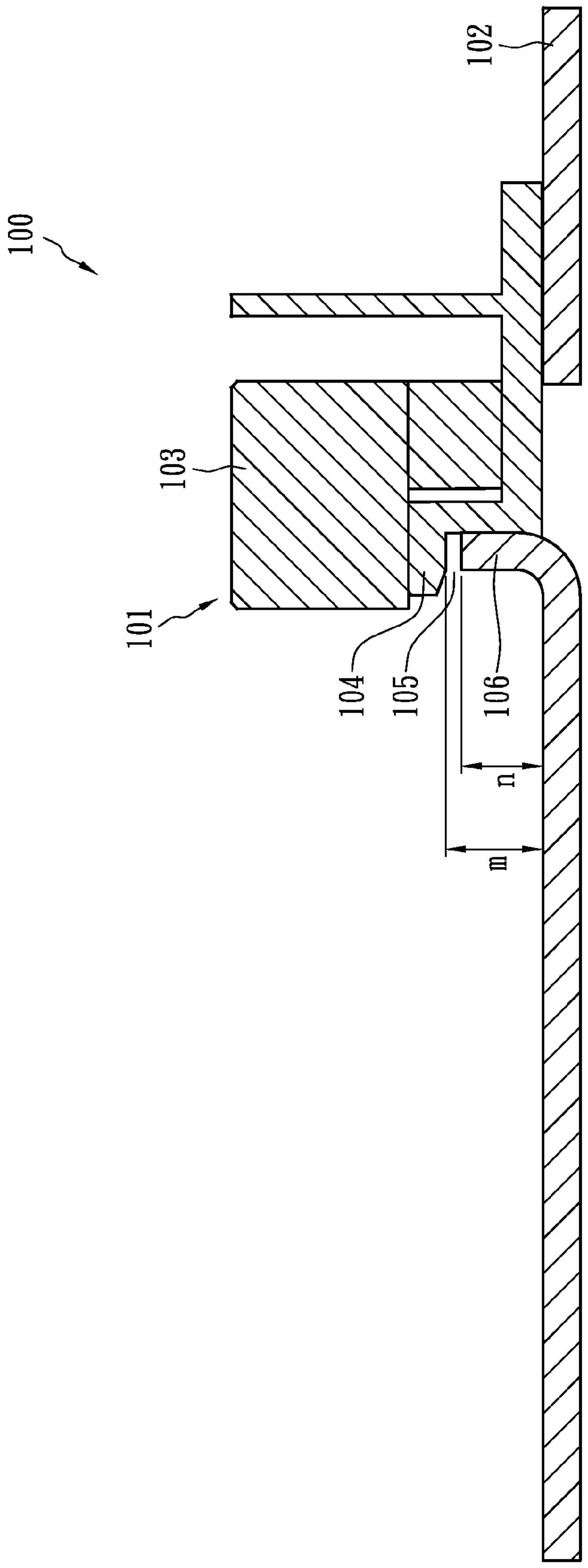

FIG. 10 illustrates a lamp socket in accordance with a fourth embodiment of the present invention, in which the lamp socket is engaged with a bezel of a backlight unit. FIG. 11 illustrates the cross-sectional view along line 1-1 of FIG. 10. A backlight unit 100 includes a lamp socket 101 and a bezel 102. The lamp socket 101 includes a socket body 103 and clamp members 104. In this embodiment, each of the clamp members 104 extends from the socket body 103. The socket body 103 may further includes a flange 107 horizontally extending from the socket body 103. As shown in FIG. 11, the flange 107 and the clamping members 104 form horizontal engaging grooves 105. The bezel 102 includes a bending end 106 to be engaged with the engaging grooves 105.

The depth m of the engaging groove 105 is greater than or equal to the height n of the bending end 106 for engaging the bending end 106 therein, thereby securing the lamp socket 101 to the bezel 102. The bending end 106 can be adjusted according to the thickness of the bezel 102 to comply with the depth of the engaging groove 105. For example, if the bezel 102 is thinner, the bending end 106 extending upward becomes longer and the bending position is nearer to the outside. In contrast, if the bezel 102 is thicker, the bending end 106 extending upward becomes shorter and the bending position is nearer to the inside. Accordingly, bezels 102 of different thicknesses can be bent according to the height of the engaging groove 105 and the bending position, so as to secure the lamp socket 101 to the bezel 102.

Figure 12:
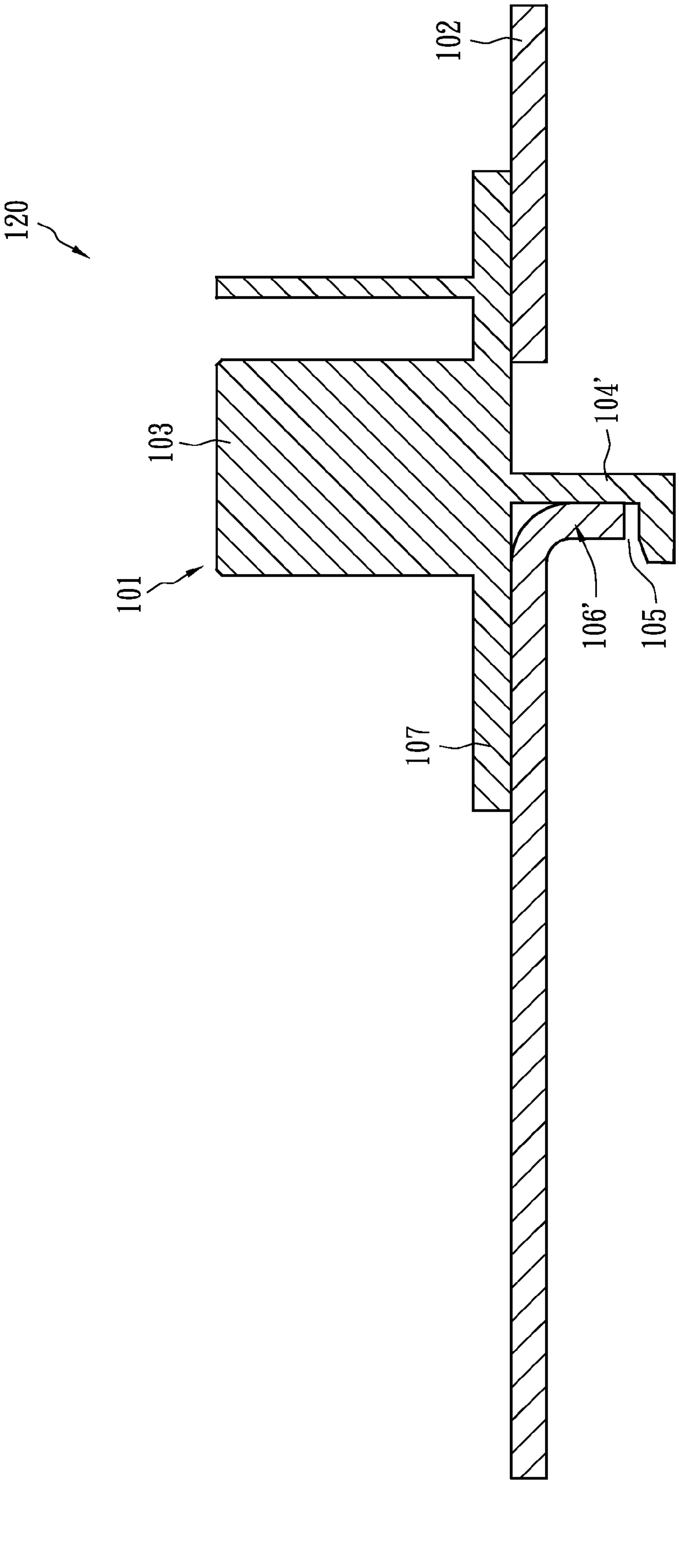
FIG. 12 illustrates a lamp socket in accordance with a fifth embodiment of the present invention.

FIG. 12 illustrates a cross-sectional view of a lamp socket in accordance with a fifth embodiment of the present invention, in which the lamp socket is secured to a bezel. A backlight unit 120 includes a lamp socket 101 and a bezel 102. The difference between this embodiment and the fourth embodiment is that the clamping member 104' extends downward from the socket body 103 and is associated with the flange 107 to form an engaging groove 105 for securing the bending end 106' of the bezel 102 therein. In other words, the extension direction (upward or downward) of the bending end 106 or 106' of the clamping member 104 or 104' of the lamp socket 101 is not restricted, and can be determined as desired.

In accordance with the present invention, a single lamp socket can be used for bezels of different thicknesses, and thus can be applied for backlight units of different dimensions, thereby obtaining superior commonness of design and reduction of mold cost. Moreover, because the single lamp socket has the same methods for assembly or disassembly and the bezels of various sizes are assembled according to the same standard of process, assembly errors can be effectively avoided.

The above-described embodiments of the present invention are intended to be illustrative only. Numerous alternative embodiments may be devised by those skilled in the art without departing from the scope of the following claims.

What is claimed is:

1. A lamp socket, comprising:

a socket body;

a flange connected to the socket body and horizontally protruding from the socket body; and a plurality of support members connected to the socket body, wherein the plurality of support member is a forked structure;

wherein the plurality of the support members and the flange therebetween form at least one engaging groove having at least two engaging widths for securing the socket body to a bezel.

2. The lamp socket of claim 1, wherein the forked structure comprises at least a first branch and a second branch, the engaging groove comprises a first engaging width and a second engaging width, the first engaging width corresponds to a gap between a top of the first branch and the flange, and the second engaging width corresponds to a gap between a top of the second branch and the flange.

3. The lamp socket of claim 1, wherein the socket body comprises a first side surface and a second side surface opposite to the first side surface, and the plurality of support members are placed on the first side surface and the second side surface.

4. The lamp socket of claim 3, wherein the socket body further comprises a third side surface and a fourth side surface, and the plurality of support members are placed on the third side surface and the fourth side surface.

5. The lamp socket of claim 1, wherein the bezel has a plurality of openings placed corresponding to the plurality of support members.

* * * * *